United States Patent

Batzer et al.

[15] 3,682,969
[45] Aug. 8, 1972

[54] EPOXIDIZED HYDROAROMATIC ACETALS

[72] Inventors: Hans Batzer, Arlesheim; Erwin Nikles, Liestal; Otto Ernst, Pfeffingen; Daniel Porret, Binningen, all of Switzerland

[73] Assignee: Ciba-Geigy AG

[22] Filed: May 21, 1970

[21] Appl. No.: 39,524

Related U.S. Application Data

[62] Division of Ser. No. 828,472, July 21, 1959, Pat. No. 3,538,115.

[52] U.S. Cl. ............... 260/338, 260/2 EA, 260/2 N, 260/231 A, 260/232, 260/340.7, 260/340.9
[51] Int. Cl. ............................................. C07d 17/00
[58] Field of Search....................................260/338

*Primary Examiner*—Norma S. Mileston
*Attorney*—Harry Goldsmith, Joseph G. Kolodny and Mario A. Monaco

[57] ABSTRACT

Epoxidized derivatives of reaction products of aldehydes of the general formula I:

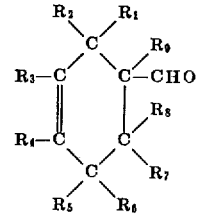

with dialcohols having at least one epoxidizable C=C double bond. The products are useful for preparing epoxy resins.

1 Claim, No Drawings

EPOXIDIZED HYDROAROMATIC ACETALS

CROSS-REFERENCE TO RELATED APPLICATIONS

This application is a division of our pending application Ser. No. 828,472, filed July 21, 1959, now Pat. No. 3,538,115.

SUMMARY OF THE INVENTION

The invention relates to reacting aldehydes of the general formula I, such as $\Delta^3$-tetrahydrobenzaldehyde, 6-methyl-tetrahydrobenzaldehyde, 2,5-endomethylene-$\Delta^3$-tetrahydrobenzal-dehyde, 6-methyl-2,5-endomethylene-$\Delta^3$-tetrahydrobenzaldehyde, etc. with a dialcohol containing at least one epoxidizable C=C double bond, such as 2-butene-1,4-diol, butadiene monoxide. glycerine monallyl ether, etc. and then epoxidizing the resulting acetal.

DESCRIPTION OF THE PREFERRED EMBODIMENTS

This invention relates to epoxidized hydroaromatic acetals and to processes for the production thereof.

According to the present invention there are provided epoxidized hydroaromatic acetals containing at least two epoxide groups and being epoxy derivatives of acetals obtained by reaction between (a) aldehydes of the general formula I:

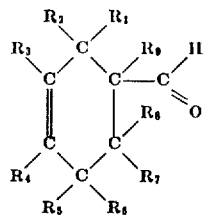

wherein $R_1$, $R_2$, $R_3$, $R_4$, $R_5$, $R_6$, $R_7$, $R_8$ and $R_9$ when taken individually represent monovalent substituents, such as halogen atoms, alkoxy groups or aliphatic, cycloaliphatic, araliphatic or aromatic hydrocarbon radicals, (e.g. lower alkyl radicals, i.e., containing one to four carbon atoms) or hydrogen atoms, or $R_1$ and $R_5$ taken together represent a divalent substituent, such as a methylene group, and (b) compounds containing at least two alcoholic hydroxyl groups (i.e. dialcohols or polyalcohols), one of the epoxide groups being in each cyclohexane ring derived from the above aldehyde.

According to a further aspect of the invention there is provided a process for the production of the said epoxidized acetals which comprises subjecting to treatment with an epoxidizing agent an acetal containing at least two epoxidizable C=C double bonds and obtainable by reaction of an aldehyde of general formula I and a compound containing at least two alcoholic hydroxyl groups.

The epoxidizing reaction may be effected by conventional methods, advantageously with the aid of organic per acids, such as peracetic acid, parbenzoic acid, peradipic acid or monoperphthalic acid. Epoxidization may also be effected by treatment with hypochlorous acid, HOCl being added to the double bond in a first stage of the reaction, and the epoxide group being formed in a second stage by treatment with an agent which splits off HCl for example a strong alkali.

Particularly advantageous properties are possessed by the diepoxide compounds of the general formula II:

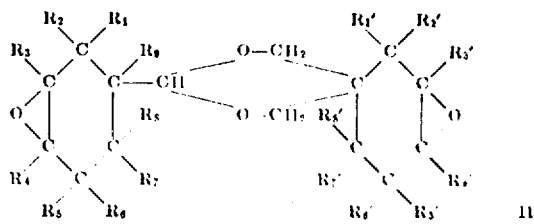

wherein $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$ and $R_9$ represent when taken individually, monovalent substituents, such as halogen atoms of aliphatic, cycloaliphatic, araliphatic or aromatic hydrocarbon radicals, (and preferably lower alkyl radicals having one to four carbon atoms) or represent hydrogen atoms, or $R_1$ and $R_5$ taken together or $R_1'$ and $R_5'$ taken together, represent a divalent substituent, such as a methylene group.

The diepoxide compounds of the type of general formula II which are most easily available are those of the formula:

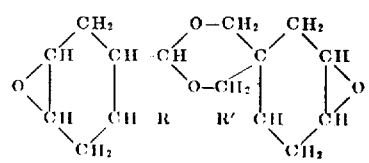

in which R and R' represent hydrogen atoms or lower alkyl radicals.

Such compounds may have the formulas:

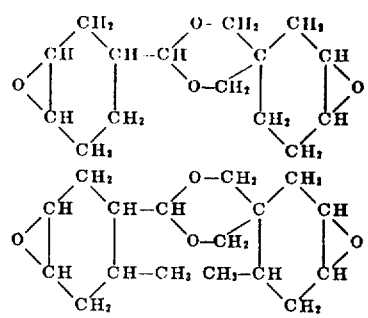

These epoxides are light, fusible resins, which can be converted with suitable hardening agents, such as for example dicarboxylic acid anhydrides, into clear and light-coloured hardened products with excellent industrial properties.

Polyepoxide compounds of the present invention which have especially advantageous properties are those of the general formula IV:

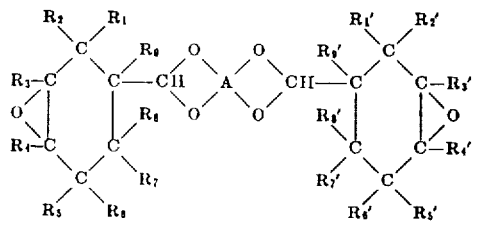

wherein A represents a tetravalent aliphatic radical which contains at least four carbon atoms and which does not comprise any carbon atoms with more than a single free valency, which aliphatic radical A may either be unsubstituted or may be substituted, for example, by hydroxyl groups, ether groups, sulfide groups, carboxyl groups, carboxylic acid ester groups, keto groups, aldehyde groups, or acetal groups, and the other symbols have the meanings assigned to them above.

Those compounds in which the radical A is substituted by more than two acetal groupings of the formula:

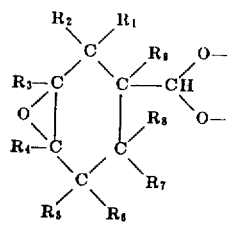

for example where there are three or four or more such groupings, are also of importance.

The diepoxide compounds of the type of general formula IV which are most easily obtainable are those of the formula

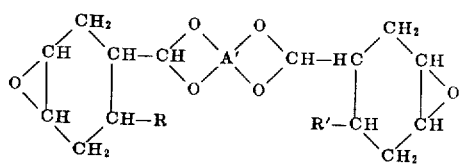

in which R and R' stand for hydrogen atoms or lower alkyl radicals and A' for a tetravalent saturated aliphatic hydrocarbon radical which is unsubstituted or is substituted by at the most two hydroxyl groups, which contains four to six carbon atoms and which comprises no carbon atom with more than a single free valency, and no hydroxyl groups bonded to carbon atoms with such a free valency.

A said diepoxide compound is that of the formula:

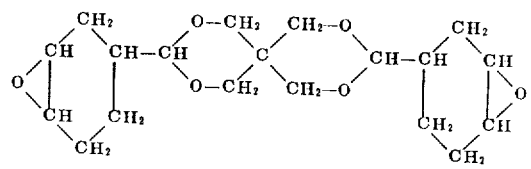

These epoxides are light, fusible resins which can be transformed with suitable hardening agents, for example dicarboxylic acid anhydrides, into clear and light, hardened products with excellent industrial properties.

A further class of compounds within the present invention are the triepoxide compounds of the general formula VI:

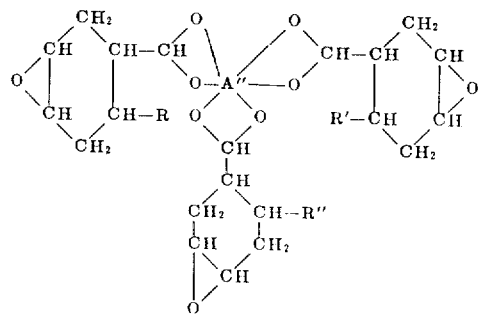

in which R, R' and R'' represent hydrogen atoms or lower alkyl radicals and A'' represents a hexavalent saturated aliphatic hydrocarbon radical which contains six carbon atoms and which does not comprise any carbon atoms with more than a single free valency.

These epoxides have similar properties to the epoxides of general formula V.

The preferred diepoxide compounds of formulae II or IV are obtained by epoxidization of hydroaromatic acetals of the formulae:

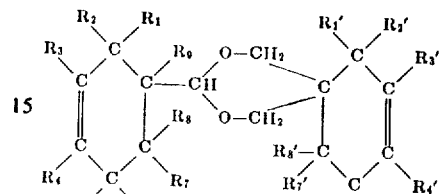

or

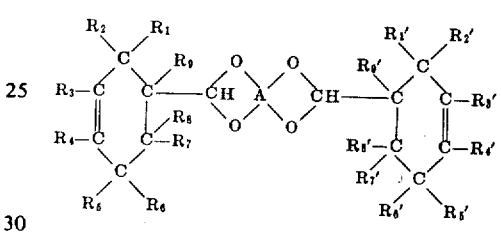

in which the various symbols have the meanings assigned to them above.

The acetals used in the process according to the invention as starting compounds and having at least two epoxidizable C = C double bonds may for example be obtained by condensing 1 mol of an aldehyde of formula I with 1 mol of a dialcohol or polyalcohol which in addition contains at least one epoxidizable C = C double bond.

Alternatively, two mols of an aldehyde of the formula I or of a mixture of two or more such aldehydes may be condensed with one mol of a polyalcohol having at least four hydroxyl groups. Depending on whether there is initially employed a homogeneous aldehyde of the formula I or mixtures of such aldehydes, there are obtained acetals of symmetrical structure or mixtures of acetals having a symmetrical structure with those of an unsymmetrical structure.

The acetalization can be effected by methods known per se, such as for example by heating an aldehyde of the formula I together with the dialcohol or polyalcohol in the presence of an acid catalyst, such as for example hydrochloric acid or toluene-p-sulfonic acid.

The aldehydes of formula I are derivatives of tetrahydrobenzene. Examples are: $\Delta^3$-tetrahydrobenzaldehyde, 6-methyl-$\Delta^3$-tetrahydrobenzaldehyde, 4-methyl-$\Delta^3$-tetrahydrobenzaldehyde, 2,4,6-trimethyl-$\Delta^3$-tetrahydrobenzaldehyde, 2,5-endomethylene-$\Delta^3$-tetrahydrobenzaldehyde, 6-methyl-2,5-endomethylene-$\Delta^3$-tetrahydrobenzaldehyde and 4-chloro-$\Delta^3$-tetrahydrobenzaldehyde.

Dialcohols and polyalcohols which contain at least one epoxidizable C = C double bond, are, for example, 2-butene-1,4-diol, glycerine monoallyl ether, butanetriol-(1,2,4-)-monoallyl ether and 1,2-bis[hydroxymethyl]-cyclohex-3-ene or dialcohols of the general formula IX:

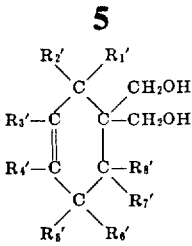

IX wherein the symbols have the meanings assigned to them above, for example, 1,1-bis[hydroxymethyl]-cyclohex-3-ene, 1,1-bis-[hydroxymethyl]-6-methyl-cyclohex-3-ene, 1,1-bis-[hydroxymethyl]-2,4,6-trimethyl-cyclohex-3-ene, 1,1-bis-[hydroxymethyl]-2,5-endomethylene-cyclohex-3-ene and 1,1-bis-[hydroxymethyl]-4-chlorocyclohex-3-ene.

The dialcohols of general formula IX are themselves readily obtainable by reaction with formaldehyde, in alkali medium, of aldehydes of general formula I in which the radical $R_9$ represents a hydrogen atom.

Polyalcohols having at least four hydroxyl groups are, for example, erythritol, xylitol, arabitol, sorbitol, mannitol, dulcitol, talitol, iditol, adonitol and pentaerythritol, heptites and 2,2,6,6-tetramethylol-cyclohexene-(1)-ol. In addition, those polyalcohols which also contain other functional groups, for example sugars, such as glucose, galactose, mannose, fructose, and cane sugar, saccharic acids, such as glucuronic acid, galacturonic acid, and mucic acid, may also be employed. Polymeric compounds with free hydroxyl groups, such as polysaccharides and more especially polyvinyl alcohol or partially hydrolysed polyvinyl acetate may also be employed.

By initially using those polyhydroxyl compounds which comprise, in suitable configuration, $2.(n+2)$ hydroxyl groups ($n$ = whole number), it is possible to react one mol of such a polyalcohol with ($n+2$) mols of an Aldehyde of the general formula I to obtain unsaturated acetals which, after epoxidation, contain ($n+2$), i.e., at least three, epoxide groups, each situated in cyclohexane rings.

Furthermore, the acetals used as starting compounds in the process of the invention may, for example, be obtained by reacting 1 mol of an aldehyde of the general formula I with 1 mol of an epoxide which in addition has one epoxidizable C = C double bond, or by reacting at least two mols of an aldehyde of general formula I with one mole of a compound containing at least two epoxide groups. In these processes the reaction proceeds by fission of the epoxide grouping or groupings, thus:

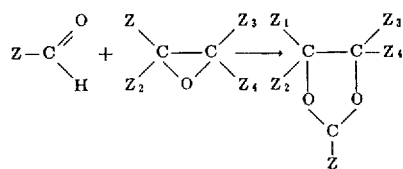

in which Z, $Z_1$, $Z_2$, $Z_3$, and $Z_4$ represent suitable substituents.

It is thus possible for example to react 2 mols of an aldehyde of general formula I with 1 mol of butadienes dioxide or dicyclopentadiene dioxide, or with 1 mol of diepoxidized fatty acids unsaturated in several positions, such as linolsic acids, whereby unsaturated aldehydes of general formula VIII are obtained.

By starting with epoxide compounds having ($n+2$) epoxide groups ($n$ = a whole number), it is of course also possible to obtain unsaturated acetals by reaction of one mol of such polyepoxides with ($n+2$) mols of an aldehyde of general formula I which acetals contain, after epoxidization, ($n+2$) epoxide groups in each cyclohexane ring.

The epoxidized acetals of the invention, depending on the polyhydroxyl compound from which they are derived may contain other functional groups. Thus the epoxidized acetals may contain free hydroxy groups as well as the acetalized hydroxyl groups of the polyalcohol, and by such variations in the compounds, the properties such as bonding strength or hydrophilic character, of the epoxide compounds according to the invention can be modified within wide limits.

The epoxidized acetals of the invention react with the conventional hardeners of epoxide compounds. Consequently, by adding such hardening agents, they can be cross-linked or cured in a manner analogous to other polyfunctional epoxide compounds and epoxide resins, respectively. Basic compounds or acid compounds, the latter for preference, are suitable hardening agents.

The following are examples of suitable hardening agents: amines or amides, such as aliphatic and aromatic primary, secondary and tertiary amines, for example monobutylamine, dibutylamine and tributylamine, p-phenylene diamine, bis-[p-aminophenyl]-methane, ethylene diamine, N,N-diethyl ethylene diamine, diethylene triamine, tetra-[hydroxyethyl]-diethylene triamine, triethylene tetramine, tetraethylene pentamine, trimethylamine, diethylamine, triethanolamine, Mannich bases, piperidine, piperazine, guanidine and guanidine derivatives such as phenyl diguanidine, diphenyl guanidine, dicyandiamide, aniline-formaldehyde resins, urea-formaldehyde resins, melamine-formaldehyde resins, polymers of aminostyrenes, polyamides, for example those from aliphatic polyamines and dimerized or trimerized unsaturated fatty acids, isocyanates, isothiocyanates; polyhydric phenols, for example resorcinol, hydroquinone, bis-(4-hydroxyphenyl)-dimethyl methane, quinone, phenol-aldehyde resins, oil-modified phenol-aldehyde resins, reaction products of aluminum alcoholates or phenolates with tautomerically reacting compounds of the type of acetoacetic ester, Friedel-Crafts catalysts, for example $AlCl_3$, $SbCl_5$, $SnCl_4$, $FeCl_3$, $ZnCl_2$, $BF_3$ and their complexes with organic compounds; phosphoric acid.

However, the preferred hardeners are polybasic carboxylic acids and their anhydrides, for example phthalic anhydride, methyl endomethylene tetrahydrophthalic anhydride or endomethylene tetrahydrophthalic anhydride, dodecenyl succinic anhydride, hexahydrophthalic anhydride, hexachloroendomethylene tetrahydrophthalic anhydride or mixtures thereof; malcic or succinic anhydrides. Accelerators such as tertiary amines and polyhydroxyl compounds, such as hexanetriol and glycerine, may be present during the hardening of the epoxidized acetals.

It has been found that in hardening the epoxide compounds of the invention with carboxylic acid anhydrides, it is advantageous to use only about 0.3 to 0.9 gram-equivalent of anhydride groups to 1 gram-equivalent of epoxide groups.

It has further been found that for some industrial applications, the properties of the hardened epoxide acetals of the invention are favorably influenced if they contain a certain proportion of corresponding acetals of which the epoxide groups have been wholly or partially saponified to hydroxyl groups. Since the said corresponding wholly or only partially hydrolyzed epoxides are generally formed simultaneously (because of side reactions) when the epoxidation is carried out in accordance with the invention, it is generally advisable not to isolate the pure diepoxides or polyepoxides from the reaction mixture.

The expression "hardening" as used herein means the conversion of the foregoing epoxide compounds to insoluble and infusible resins.

The present invention further provides hardenable mixtures which contain the epoxidized acetals of the invention together with hardening agents for epoxy resins, preferably dicarboxylic or polycarboxylic acid anhydrides.

The hardenable mixtures according to the invention advantageously contain, as indicated above, a proportion of the corresponding acetals of which the epoxide groups are wholly or partially saponified to hydroxyl groups and/or other polyhydroxyl compounds such as hexanetriol, which have a cross-linking action. Other polyepoxides may be added to the hardenable epoxide compounds, e.g., monoglycidyl or polyglycidyl ethers of monoalcohols or polyalcohols, (such as butyl alcohol, 1,4-butanediol or glycerine) of monophenols or polyphenols (such as resorcinol, bis-[4-hydroxyphenyl]-dimethyl methane) or of condensation products of aldehydes with phenols (novolaks), polyglycidyl esters of polycarboxylic acids such as phthalic acid, and also aminopolyepoxides, such as those which are for example obtained by dehydrohalogenation of reaction products of epihalohydrins and primary or secondary amines such as n-butyl-amine, aniline or 4,4'-di-(monomethylamino)-diphenyl methane.

The hardenable epoxide compounds or their mixtures with hardeners may have added thereto fillers, plasticisers coloring substances and the like at any stage prior to the hardening. Asphalt, bitumen, glass fibers, mica, powdered quartz, cellulose, kaolin, finely divided silica (aerosil) or metal powders can be used as extenders and fillers.

The mixtures of the epoxide compounds of the invention and the hardeners can be used in the unfilled or filled condition, or in the form of solutions or emulsions, as textile auxiliaries, lamination resins, lacquers, coating agents, dipping resins, casting resins, brushing, filling and trowelling compounds, adhesives and the like or for the production of such agents. The hardened epoxide compounds of the invention are especially valuable as insulating compounds for the electrical industry.

The compounds of the general formulae I, II and IV may also be represented by following general formulae Ia, IIa and IVa without changing the scope of the invention:

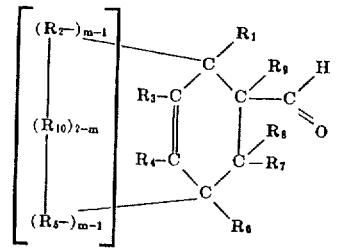

Ia

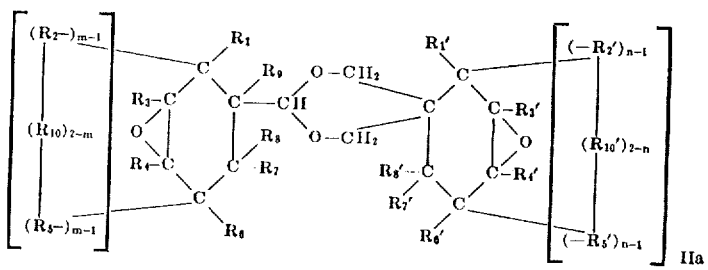

IIa

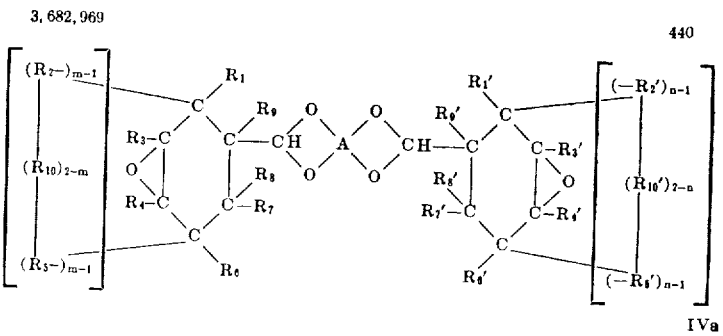

IVa

In these formulae m and n each represents a whole number of at the most 2, $R_1$, $R'_1$, $R_2$, $R'_2$, $R_3$, $R'_3$, $R_4$, $R'_4$, $R_5$, $R'_5$, $R_6$, $R'_6$, $R_7$, $R'_7$, $R_8$, $R'_8$, $R_9$ and $R'_9$ are of the group consisting of hydrogen atom, halogen atom, alkoxy group, aliphatic hydrocarbon radical, cycloaliphatic hydrocarbon radical, araliphatic hydrocarbon radical and aromatic hydrocarbon radical, preferably an alkyl group containing one to four carbon atoms, $R_{10}$ and $R'_{10}$ each stands for an alkylene group, preferably for a methylene group, and A represents a tetravalent aliphatic radical containing at least four carbon atoms and being free from any carbon atoms with more than a single free valency.

In the following examples, parts represent parts by weight, and percentages represent percentages by weight; the ratio between parts by weight and parts by volume is the same as between kilograms and liters; the temperatures are given in degrees Centigrade.

EXAMPLE 1

Acetal of $\Delta^3$-tetrahydrobenzaldehyde and 1,1-bis-(hydroxymethyl)-cyclohex-3-ene 422 Parts of $\Delta^3$-tetrahydrobenzaldehyde, 506 parts of 1,1-bis-(hydroxy-methyl)-cyclohex-3-ene, 5 parts of toluene sulfonic acid and 2000 parts by volume of benzene are boiled in a cyclic distillation apparatus (as described by H.Batzer and collaborators in "-Makromolekular Chemie" 7, (1951), lines 84–85) until the separation of water ceases.

After adding 5 parts of piperidine, the mixture is filtered and the solvent evaporated. The residue yields by distillation at approximately 120°/0.2 mm.Hg 774 parts of the spirocyclic acetal. The product crystallizes on standing. Crystallization from methanol yields the product, m.p. 55–56°.
Analysis: $C_{15}H_{22}O_2$
 calculated:  C 76.88%  H 9.46%  O 13.66%
 found:   C 77.02%  H 9.53%  O 13.80%.

Epoxide

1174 Parts of the acetal described above are dissolved in 3000 parts by volume of benzene and 100 parts of sodium acetate are added. 2200 Parts of 42 percent peracetic acid are added in portions during 1 ½ hours while stirring. The temperature is kept at about 30° by cooling. After the mixture has reacted for another 2 hours at 30° while stirring constantly, it is cooled to 0°. Titration shows the consumption of the theoretical quantity of peracetic acid.

The benzene solution is washed three times with 1000 parts by volume of water and 1000 parts by volume of 2N sodium carbonate solution (the pH value of the aqueous solution should be about 10 after extraction). The combined aqueous solutions are extracted with 1500 parts by volume of benzene. The combined benzene solutions are dried over sodium sulfate, filtered and concentrated by evaporation in vacuo. The last traces of solvent are removed under high vacuum at 100°. There are obtained 1067 parts of a crystal-clear, thickly liquid resin with an epoxide content of 6.0 epoxide equivalents per kg.

For determining the epoxide content, about 1 g of epoxide is dissolved in 30 ml of glacial acetic acid and titrated with 0.5 N hydrogen bromide in glacial acetic acid in the presence of crystal violet until the color of the indicator changes to bluish-green. A consumption of 2 cc of 0.5N HBr-solution corresponds to one epoxide equivalent per kg.

EXAMPLE 2

Acetal from 6-methyl-$\Delta^3$-tetrahydrobenzaldehyde and 1,1-bis-(hydroxymethyl)-6-methyl-cyclohex-3-ene.

405 Parts of 6-methyl-$\Delta^3$-tetrahydrobenzaldehyde, 468 parts of 1,1-bis-(hydroxymethyl)-6-methyl-cyclohex-3-ene, 1 part of toluene-p-sulfonic acid and 100 parts by volume of benzene are boiled in a cyclic distillation apparatus until the separation of water ceases.

There is then added to the solution 1 part of finely powdered anhydrous sodium acetate and the solution is then filtered and concentrated by evaporation. The residue yields on distillation at 118°/0.3 mm.Hg 748 parts of the condensation product.
Analysis: $C_{17}H_{26}O_2$
 calculated: C 77.82%  H 9.99%  O 12.20%
 found:   C 77.63%  H 9.90%  O 12.48%

Epoxide

473 Parts of the acetal described above are dissolved in 3000 parts by volume of benzene. 30 Parts of anhydrous sodium acetate are added and, over a period of 1 hour, 850 parts of 42 percent peracetic acid are added in portions and while stirring. The temperature is kept at 30° by external cooling. The mixture is stirred for another 4 hours and kept at 30° by occasional cooling. Thereafter, it is left to stand for 14 hours at 0°. Titration shows the consumption of the theoretical quantity of peracetic acid.

The lower aqueous layer is separated. While cooling, 880 parts by volume of concentrated sodium hydroxide solution are run into the thoroughly stirred benzene solution. The precipitated sodium acetate is filtered off and the aqueous layer extracted with benzene. The combined benzene solutions are concentrated by evaporation. There are obtained 487 parts of resin with an epoxide content of 5.2 epoxide equivalents per kg.

The epoxide can be distilled at approximately 108°/0.07 mm.Hg.
Analysis: $C_{17}H_{26}O_4$
 calculated: C 69.36%  H 8.90%  O 21.74%
 found:   C 69.42%  H 8.87%  O 22.01%.

EXAMPLE 3

Acetal from 2,5-endomethylene-$\Delta^3$-tetrahydrobenzaldehyde and 1,1-bis-(hydroxymethyl)-6-methyl-cyclohex-3-ene.

A mixture of 122 parts of 2,5-endomethylene-$\Delta^3$-tetrahydrobenzaldehyde, 156 parts of 1,1-bis-(hydroxy-methyl)-6-methyl-cyclohex-3-ene, 0.5 part of toluene-p-sulfonic acid and 500 parts by volume of benzene is boiled in a cyclic distillation apparatus until the separation of water ceases. The mixture is neutralized with 1 part by volume of piperidine, the solvent is evaporated and residue is distilled under high vacuum. The product (202 parts) distils over at 135-150°/0.02 mm.Hg and immediately solidifies. For analysis purposes, a preparation is re-crystallized from methanol; m.p. 92°–94°.
Analysis: $C_{17}H_{24}O_2$
 calculated:  C 78.42%  H 9.29%
 found:   C 78.20%  H 9.38%.

Epoxide

170 Parts of the acetal described above (crude product) are dissolved in 750 parts by volume of benzene. 30 Parts of sodium acetate are added and the acetal is epoxidized with 300 parts of 42 percent peracetic acid at 30° during 1 ½ hours. After this time, 95 percent of the theoretical amount of peracetic acid are consumed.

For working up, the benzene solution is washed with water and 2N sodium carbonate solution. After driving off the benzene, there are obtained 158 parts of epoxide resin.

70 Parts of the epoxide resin obtained and 29 parts of phthalic acid anhydride are melted, mixed at about 125° and placed in an aluminum casting mould. After hardening (7 hours at 120° and then 24 hours at 160°), the casting has the following properties:

Bending strength 7.81 kg/mm$^2$
Impact bending strength 4.56 cmkg/cm$^2$
Martens dimensional stability under heat 185°.

EXAMPLE 4

Bis-(6-methyl-$\Delta^3$-tetrahydrobenzal)-D-sorbitol 95.6 Parts of D-sorbitol are condensed in a cyclic distillation apparatus with 135 parts of 6-methyl-$\Delta^3$-tetrahydrobenzaldehyde in the presence of 0.5 part of toluene-p-sulfonic acid and 500 parts by volume of benzene. After boiling for 22 hours, the sorbitol is almost completely dissolved and the separation of water ceases. 1 g of finely powdered anhydrous sodium acetate is added thereto, and the solution is then filtered and the filtrate is concentrated by evaporation. There are obtained 161 parts of residue in the form of a solid mass.

Bis-(3,4-epoxy-6-methyl-hexahydrobenzal)-D-sorbitol

152 Parts of the previously described bis-(6-methyl-$\Delta^3$-tetrahydrobenzal)-D-sorbitol are dissolved in 750 parts by volume of benzene and 20 parts of sodium acetate are added thereto. 200 Parts of 42 percent peracetic acid are added during 25 minutes, while stirring and cooling. The mixture is kept for another 40 minutes at approximately 30° and after this time 96 percent of the theoretical amount of peracetic acid has been consumed.

The solution is washed three times with 250 parts of water and twice with 250 parts of 2N sodium carbonate solution. The combined aqueous solutions are extracted with 400 parts by volume of benzene. The combined benzene solutions, on being concentrated by evaporation, yield 121 parts of resin with an epoxide content of 3.9 epoxide equivalents per kg.

EXAMPLE 5

Bis-($\Delta^3$-tetrahydrobenzal)-pentaerythritol

A mixture of 419 parts of pentaerythritol, 700 parts of $\Delta^3$-tetrahydrobenzaldehyde, 2 parts of toluene-p-sulfonic acid and 1500 parts by volume of benzene is boiled in a cyclic distillation apparatus until the separation of water ceases, (12 hours). The mixture is neutralized with 4 parts of anhydrous sodium acetate, filtered and then the solution is concentrated by evaporation under water-pump vacuum. There are obtained 974 parts of bis-($\Delta^3$-tetrahydro-benzal)-pentaerythritol m.p. 87°–91°. Recrystallization from methanol yields a product m.p. 96°–97°.

Analysis: $C_{19}H_{28}O_4$
calculated: C 71.22% H 8.81% O 19.97%
found: C 71.51% H 8.73% O 19.96%

Bis-(3,4-epoxyhexahydrobenzal)-pentaerythritol

960 Parts of the bis-($\Delta^3$-tetrahydrobenzal)-pentaerythritol (crude product) as described above are dissolved in 3000 parts by volume of benzene. 140 Parts of anhydrous sodium acetate are added and then, over a period of 1 hour, 1400 ports of 42 percent peracetic acid are added in portions and while stirring. The temperature is kept at approximately 24°–28° by colling. After the mixture has reacted for another hour at 25°–30, while being occasionally cooled, the mixture is cooled to 5°.

The solution of the epoxide is washed three times, each time with 600 parts by volume of water and 2N sodium carbonate solution until neutral in reaction and then it is dried for a short time over sodium sulfate. After concentrating the benzene solution by evaporation, there are obtained 860 parts of resin with an epoxide content of 5.0 epoxide equivalents per kg. By benzene extraction of the aqueous solutions, it is possible to obtain some further epoxide.

70 Parts of the epoxide resin which is obtained and 26 parts of phthalic acid anhydride are melted and mixed at about 12520. The mixture is placed in an aluminum casting mould and hardened for 7 hours at 120°, and then for 24 hours at 150°. The casting has the following properties: Bending strength 0.39 kg/mm$^2$
Impact bending strength 10 10 cmkg/cm$^2$
Martene dimensional stability under rest 179100

EXAMPLE 6

Bis-(6-methyl-$\Delta^3$-tetrahydrobenzal)-pentaerythritol

A mixture of 248 parts of 6-methyl-$\Delta^3$-tetrahydrobenzaldehyde, 138 parts of pentaerythritol, 1 part of toluene-p-sulfonic acid and 500 parts by volume of benzene is boiled in a cyclic distillation apparatus until the separation of water ceases. 2 Parts of anhydrous sodium acetate are added thereto and the solution is then filtered and concentrated by evaporation. There are obtained 298 parts of crystalline bis-(6-methyl-$\Delta^3$-tetrahydrobenzal)-pentaenythritol.

Crystallization from methanol yields the product, m.p. 137°–142°.

Analysis: $C_{21}H_{32}O_4$
calculated: C 72.38% H 9.26%
found: C 72.31% H 9.13%

Bis-(3,4-epoxy-6-methyl-hexahydrobenzal)-pentaerythritol

298 Parts of the previously described bis-(6-methyl-$\Delta^3$-tetrahydro-benzal)-pentaerythritol (crude product) are dissolved in 1200 parts by volume of benzene. 35 Parts of anhydrous sodium acetate are added and then, over a period of 1 ½ hours, 500 parts of 42 percent peracetic acid are added while stirring. The temperature is kept at 30° by cooling. The mixture is allowed to react for another 2 hours at 25°–27°. The aqueous phase is separated and the benzene layer is washed three times with 300 parts of water and twice with 250 parts of sodium carbonate solution. The aqueous parts are extracted with 400 parts by volume of benzene. The combined benzene solutions are dried over sodium sulfate, filtered and concentrated by evaporation. There are obtained 285 parts of solid resin with an epoxide content of 3.9 epoxide equivalents per kg.

65 Parts of the epoxide resin which is obtained are mixed with 25 parts of phthalic acid anhydride, melted and placed in an aluminum casting mould. The casting is hardened for 7 hours at 120° and then for 24 hours at 160°. It has the following properties:
Bending strength   10.14kg/mm$^2$
Impact bending strength   7.24cmkg/cm$^2$

EXAMPLE 7

Tris-($\Delta^3$-tetrahydrobenzal)-D-mannitol

182 Parts of D-Mannitol are suspended in 1000 parts by volume of benzene and 2 parts of toluene-p-sulfonic acid are added thereto. The suspension is heated while stirring in a cyclic distillation apparatus to boiling point and 354 parts of $\Delta^3$-tetrahydrobenzaldehyde are added thereto. After 8 hours, 1 part of toluene-p-sulfonic acid and 46 parts of $\Delta^3$-tetrahydrobenzaldehyde are introduced. The mixture is boiled for another 14 hours, 6 parts of anhydrous sodium acetate are then added, and the product is filtered and concentrated by evaporation. There are thus obtained 474 parts of solid non-crystalline residue.

Tris-(3,4-epoxyhexahydrobenzal)-D-mannitol

200 Parts of the tris-($\Delta^3$-tetrahydrobenzal)-D-mannitol previously described are dissolved in 1000 parts by volume of benzene and 20 parts of anhydrous sodium acetate are added thereto. During 40 minutes, while constantly stirring and cooling (internal temperature 30°), 300 parts of 42 percent per-acetic acid are added in portions. The mixture is stirred for another 2 hours and kept at 30°. It is then cooled with ice and the benzene solution is washed with water and 2N sodium carbonate solution until neutral in reaction. After evaporating the benzene, there are obtained 208 parts of resin with an epoxide content of 5.4 epoxide equivalents per kg. 60 Parts of the epoxide resin which is obtained and 33 parts of phthalic acid anhydride are melted and homogeneously mixed at 130°. The mixture is introduced into an aluminum casting mould and hardened for 1 hour at 120° and then for 15 hours at 150°. The casting has the following properties:
Bending strength   7.4 kg/mm$^2$
Impact bending strength   4.0 cmkg/cm$^2$
Water absorption after 4 days at room temperature   0.69%
Martens dimensional stability   157°

EXAMPLE 8

Bis-($\Delta^3$-tetrahydrobenzal)-glucose

90 Parts of anhydrous glucose, 120 parts of $\Delta^3$-tetrahydrobenzaldehyde, 0.5 part of toluene-p-sulfonic acid and 500 parts by volume of benzene are boiled in a cyclic distillation apparatus while stirring. After heating for about 50 hours, the separation of water ceases. There is then added to the solution 1 part of anhydrous sodium acetate and the solution is then filtered and concentrated by evaporation. There are obtained 160 parts of crude bis-($\Delta^3$-tetrahydrobenzal)-glucose.

Epoxide

160 Parts of the acetal described above are dissolved in 500 parts by volume of benzene. 20 Parts of sodium acetate are added to the solution and during 42 minutes, 200 parts of 42 percent peracetic acid are introduced at 30°, while stirring and cooling. The mixture is kept for another 50 minutes at 30° and then cooled to 0°. The organic phase is washed three times with 200 parts of water and twice with 200 parts of sodium carbonate solution. The combined aqueous solutions are extracted with 300 parts by volume of benzene. On concentrating the combined benzene solutions by evaporation, there are obtained 143 parts of solid epoxide resin with an epoxide content of 4.7 epoxide equivalents per kg.

EXAMPLE 9

150 Parts of the commercial first-hydrolysis compound which is formed when cellulose is obtained from wood (first-fraction sugar) and which contains 76.5 percent of dry substance, are boiled while stirring in a cyclic distillation apparatus with 220 parts of $\Delta^3$-tetrahydrobenzaldehyde in the presence of 400 parts by volume of benzene and 2 parts of toluene-p-sulfonic acid. After 36 hours 50 parts of water are separated. On standing at room temperature, a crystalline material is precipitated. The mixture is filtered and concentrated by evaporation. The residue is dissolved in 1500 parts by volume of chlorobenzene. 390 Parts of 33 percent peracetic acid (free from sulfuric acid) are added in portions to the thoroughly stirred solution. The temperature is kept at 27°–33° by cooling. After 1 ½ hours, 78 parts of peracetic acid (calculated at 100 percent) are consumed. The organic phase is separated and concentrated by evaporation under water-pump vacuum. There are thus obtained 127 parts of a solid slightly-colored resin with an epoxide content of 3.7 epoxide equivalents per kg.

EXAMPLE 10

440 Parts of $\Delta^3$-tetrahydrobenzaldehyde (4 mols) are mixed with 352 parts of 2,3-buten-1,4-diol. Heat is developed, the temperature rising from 20° to 42°. After 30 minutes, the mixture is cooled and 1.5 parts by volume of 50 percent sulfuric acid and 1500 parts by volume of benzene are added. The mixture is then heated to boiling point and the water formed in the reaction is distilled off azeotropically. The separation of the water (70 parts) takes 110 minutes. The benzene is then distilled off under partial vacuum, 10 parts of anhydrous sodium acetate are added and the reaction mixture is subjected to fractional distillation at 11 mm.Hg. The following fractions are obtained:
45°–55°   37 parts of $\Delta^3$-tetrahydrobenzaldehyde
121°   564 parts of acetal
Residue   199 parts (contains butendiol).

Epoxide

54 Parts of the previously described acetal are dissolved in 200 parts of benzene and 6 parts of anhydrous sodium acetate are added. 121 Parts of 39.6 percent peracetic acid are then added dropwise over a period of 15 minutes. By gentle cooling, the temperature is kept at about 30°. The exothermic reaction lasts about 90 minutes. The reaction mixture is then left to stand for another 30 minutes, washed twice with 100 parts by volume of water, the benzene is distilled off and the product finally concentrated in vacuo. As residue, there are obtained 51 parts of a colorless liquid resin with an epoxide content of 5.5 epoxide equivalents per kg, which mainly consists of the compound of the formula:

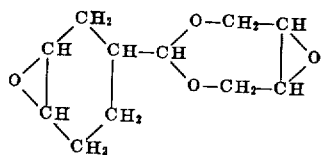

EXAMPLE 11

120 Parts of butadiene monoxide are mixed with 400 parts by volume of carbon tetrachloride and with 220 parts of $\Delta^3$-tetrahydrobenzaldehyde. 20 Parts of tin tetrachloride, dissolved in 100 parts by volume of carbon tetrachloride, are then added dropwise over a period of 45 minutes. The temperature is kept at 39°–42 by cooling. Thereafter, the mixture is left for another 2 hours at the same temperature. It is then cooled and run into 500 parts by volume of substantially 20 percent sodium hydroxide solution. The organic phase is separated, dried with sodium sulfate, filtered and concentrated by evaporation. By distillation of the residue, there are obtained at 105°–127° mm, 101 parts of crude acetal. Further distillation, through a Raschig column of height 30 cm, yields a product b.p. 117°–118°/18mm.

Analysis: $C_{11}H_{16}O_2$
calculated: C 73.30 percent  H 8.95%
found: C 72.9%  H 9.0%.

18.0 Parts of the cyclic acetal are mixed with 500 parts by volume of a chloroform solution of 34.8 parts of perbenzoic acid. By gentle cooling, the temperature is kept at 20°–25°. Half of the theoretical quantity of perbenzoic acid is consumed after about half an hour and the complete epoxidation takes 2 ½ days. The chloroform solution is shaken with sodium carbonate solution, dried, filtered and concentrated by evaporation, a thickly liquid epoxide being obtained.

EXAMPLE 12

193 Parts of dicyclopentadiene are dissolved in 1000 parts by volume of benzene. In the presence of 35 parts of sodium acetate, the solution is allowed to react with 300 parts of 42 percent peracetic acid at 30°–32° until 60 percent of the quantity of peracetic acid necessary for epoxidation of both double bonds is consumed. The benzene solution is washed free from acid with water and sodium carbonate solution and then evaporated.

150 Parts of the residue which is obtained and 110 parts of $\Delta^3$-tetrahydrobenzaldehyde are dissolved in 1000 parts by volume of carbon tetrachloride. A mixture of 20 tin of time tetrachloride and 50 parts by volume of carbon tetrachloride are added dropwise to the solution at 30°–40° within 1 hour. After the mixture has stood for one day at room temperature, it is shaken with 500 parts by volume of substantially 20 percent sodium hydroxide solution. The organic phase is separated, dried over sodium sulfate and concentrated in vacuo, 234 parts of residue being obtained.

200 Parts of the product which is obtained are allowed to react in benzene solution in the presence of 35 parts of sodium acetate with 350 parts of 42 percent peracetic acid at 29°–32°. After 1 ½ hours, 118 parts (calculated as 100 percent) of peracetic acid are consumed. The solution is washed free from acid with water and sodium carbonate solution dried and evaporated. 146 Parts of solid epoxide are obtained.

EXAMPLE 13

Samples of a cycloaliphatic polyepoxide (Resin A) prepared according to Example 1 and also a polyglycidyl ether resin which is liquid at room temperature and which has an epoxide content of about 5.3 epoxide equivalents per kg, prepared by reacting epichlorhydrin with bis-(4-hydroxyphenyl)-dimethyl methane in the presence of alkali (Resin C) and samples of mixtures of resins A and C in two different ratios, are melted with phthalic acid anhydride as hardening agent at 120°–130°, 0.75 equivalent of anhydride groups being used in each case to one equivalent of epoxide groups of the resins A and C and of the resin mixtures.

The mixtures are all cast in aluminum moulds (40 × 10 × 140 mm) at about 120° and hardened for 24 hours at 140°.

The dimensional stability under heat of the hardened cast samples is shown in the following Table:

| Parts Resin A | Parts Resin C | Dimensional stability under heat according to Martens (DIN) °C. |
|---|---|---|
| 100 | 0 | 159 |
| 50 | 50 | 148 |
| 25 | 75 | 131 |
| 0 | 100 | 98 |

EXAMPLE 14

Samples of a cycloaliphatic polyepoxide compound (Resin B) prepared according to Example 2, and also a cycloaliphatic epoxide ester of the formula:

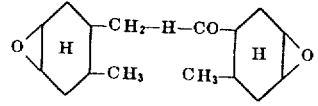

(the product "EP 201" sold by Union Carbide Corporation) with an epoxide content of about 0.35 epoxide equivalents per kg (Resin D) are melted with phthalic acid anhydride as hardening agent at 120°–130°, 0.45, 0.65 and 0.90 equivalent, respectively, of anhydride groups being used to one equivalent of epoxide groups.

Mixtures are cast as described in Example 13 and each hardened for 24 hours at 140°. The dimensional stability under heat of the hardened castings starting from Resin B and Resin D, are compared with one another in the following Table:

| Equivalent phthalic acid anhydride per 1 equivalent epoxide groups | Martens dimensional stability under heat (DIN) in °C with | |
|---|---|---|
| | Resin B | Resin D |
| 0.45 | 184 | 71 |
| 0.85 | 184 | 163 |
| 0.90 | 167 | 149 |

EXAMPLE 15

28.5 Parts of phthalic acid anhydride are dissolved at 120°–130° in 100 parts of the cycloaliphatic epoxide resin A prepared according to Example 1. The mixture has a viscosity of less than 20 centipoises at 120° and a viscosity of 1500 centipoises after 1 ½ hours at 120°.

A first portion of the mixture is cast in an aluminum mould (40 × 10 × 140 mm) and is hardened, initially for 24 hours at 140° and then for 24 hours at 200°. The casting which is obtained has an exceptionally high dimensional stability (measured according to Martens DIN) of 230°.

A second portion of the above mixture is cast on to glass plates in thicknesses of 1/10 mm and 1 mm and hardened for 24 hours at 140°. The resulting films are resistant to treatment for 1 hour at room temperature with 5N-sulfuric acid, 5N-sodium hydroxide solution, water, acetone and chlorobenzene.

EXAMPLE 16

100 Parts of a cycloaliphatic polyepoxide resin prepared in a manner analogous to Example 1 and having an epoxide content of 7.0 epoxide equivalents per kg are mixed at room temperature with 7.9 parts (Sample 1) and with 15.9 parts (Sample 2) of 2,4-dihydroxy-3-oxy-methyl-pentane. As hardening agent, there are used in both cases 31 parts of phthalic acid anhydride (0.3 equivalent of anhydride groups per 1 epoxide group).

The phthalic acid anhydride is dissolved as described in Example 15. The mixtures are cast in aluminum moulds as in Example 13 and hardened for 24 hours at 140°. The hardened castings have the following properties:

| Sample | Impact bending strength in kg/cm² | Dimensional stability under heat according to Martens (DIN) in °C |
|---|---|---|
| 1 | 6.8 | 179 |
| 2 | 13.5 | 163 |

EXAMPLE 17

14 Parts of 2,4-dihydroxy-3-oxymethyl-pentane are mixed with 100 parts of a polyepoxide resin A (Sample 1) prepared according to Example 1 and another 14 parts thereof with 100 parts of the epoxide ester resin D (Sample 2) described in Example 14, the mixing taking place at room temperature.

As hardening agents, 0.75 equivalent of methyl-endomethylene tetrahydrophthalic acid anhydride were added per equivalent of epoxide groups at room temperature in each case. The casting mixtures thus obtained are cast at room temperature and both initially hardened for 16 hours at 100° and then for 24 hours at 160°. The bending strength and the dimensional stability under heat of the hardened castings are compared below:

| Sample | Bending strength kg/mm² | Martens dimensional stability under heat (DIN) in °C |
|---|---|---|
| 1 | 10.2 | 153 |
| 2 | 9.1 | 136 |

Similar properties are obtained if the 2,4-dihydroxy-3-oxymethyl-pentane in Sample 1 is replaced by 0.5–1 part of tris-(dimethyl-aminoathyl)-phenol or the andomethylene tetrahydrophthalic acid anhydride as hardening agent is replaced by the mixture obtained by melting together 78 percent of hexahydrophthalic acid anhydride, 13 percent of tetrahydrophthalic acid anhydride and 9 percent of phthalic acid anhydride this mixtures being liquid at room temperature.

EXAMPLE 18

100 Parts of the cycloaliphatic epoxide resin B prepared according to Example 2, are mixed at room temperature with 24.5 parts of triethylene tetramine as hardening agent.

A first part of the hardenable mixture is cast, as described in Example 17, in a aluminum mould at room temperature, while a second portion of this mixture is used for the production of adhesive joints. For the latter purpose, degreased and polished aluminum sheets (170 × 25 × 15 overlap 10 mm) are stuck together, the said sheets being obtainable under the name "Anticorodal B".

The hardening in each case is carried out initially for 17 hours at 200° and then for 24 hours at 160°. The properties of the hardened castings and the adhesive joints are as follows:

Bending strength 11.0 kg/mm²
Dimensional stability under heat according to Martens (DIN) 111°
Tensile-shear strength 1.2 kg/mm²

What is claimed is:

The diepoxy compound having the formula

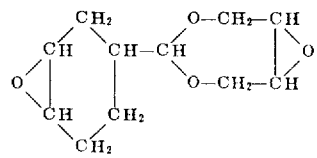

* * * * *

PO-1050
(5/69)

UNITED STATES PATENT OFFICE
CERTIFICATE OF CORRECTION

Patent No. 3,682,969              Dated August 8, 1972

Inventor(s) HANS BATZER ET AL

It is certified that error appears in the above-identified patent and that said Letters Patent are hereby corrected as shown below:

Cover page, after "Ciba-Geigy AG" insert --- Basle, Switzerland ---.

Signed and sealed this 30th day of April 1974.

(SEAL)
Attest:

EDWARD M. FLETCHER, JR.          C. MARSHALL DANN
Attesting Officer                Commissioner of Patents